United States Patent [19]
Paliard

[11] Patent Number: 5,454,714
[45] Date of Patent: Oct. 3, 1995

[54] EQUIPMENT FOR AND METHOD OF PRECALCINING ANY MINERAL MATERIALS WHATSOEVER

[75] Inventor: Maurice Paliard, Saint Etiennne, France

[73] Assignee: CLE, Courbevoie, France

[21] Appl. No.: 283,646

[22] Filed: Aug. 1, 1994

Related U.S. Application Data

[62] Division of Ser. No. 67,357, May 26, 1993, Pat. No. 5,364,265.

[30]     Foreign Application Priority Data

May 29, 1992 [FR] France .................................. 92 06579

[51] Int. Cl.⁶ .................................................. F27B 15/00
[52] U.S. Cl. ................................................ 432/14; 432/106
[58] Field of Search ................................ 432/14, 106, 58

[56]         References Cited

U.S. PATENT DOCUMENTS

| | | | |
|---|---|---|---|
| 4,050,882 | 9/1977 | Kohl et al. ................................ | 432/14 |
| 4,514,170 | 4/1985 | Kupper .................................... | 432/106 |
| 4,747,879 | 5/1988 | Wolter et al. ........................... | 106/100 |
| 4,929,178 | 5/1990 | Maury et al. ............................. | 432/14 |
| 5,364,265 | 11/1994 | Paliard .................................... | 432/106 |

*Primary Examiner*—Henry A. Bennett
*Assistant Examiner*—Siddharth Ohri
*Attorney, Agent, or Firm*—Steinberg, Raskin & Davidson

[57]             ABSTRACT

An equipment for precalcining any mineral materials whatsoever comprising a precalciner consisting of a combustion chamber communicating through a passage-way with a reaction chamber itself communicating via a duct with a separation cyclone, the reaction chamber being fed with smokes issuing from a firing furnace and three ducts feeding with hot air issuing from a cooler the combustion chamber, a voluted casing at the level of a burner and said duct, respectively, the equipment in particular permitting the manufacture of cement clinker while greatly minimizing the emission of nitrogen oxides.

8 Claims, 3 Drawing Sheets

EQUIPMENT FOR AND METHOD OF PRECALCINING ANY MINERAL MATERIALS WHATSOEVER

This is a division of application Ser. No. 08/067,357 filed May 26, 1993, now U.S. Pat. No. 5,364,265.

BACKGROUND OF THE INVENTION

The present invention relates to an equipment for precalcining any mineral materials whatsoever for example such as cement clinker, lime, alumina, magnesia or dolomite.

It is also directed to a method of precalcining such materials.

There has already been proposed equipment for precalcining mineral materials comprising in particular a precalciner essentially consisting of a combustion chamber fed with hot air, of a reaction chamber communicating with the combustion chamber and supplied with smokes rich in nitrogen oxides issuing from a firing or calcining furnace, oven or like kiln and of a cyclone permitting the separation of the material and connected to the reaction chamber by a duct.

It is possible to operate this kind of equipment during a reducing run so as to at least partially remove the nitrogen oxides. The reduction of the nitrogen oxides however is limited because in such equipments much unburnt carbon is generated during a reducing run which is practically inactive for the reduction of the nitrogen oxides. Moreover this unburnt carbon is difficult to be subsequently reoxidized and is detrimental to tile good operation of the firing furnace.

OBJECT AND SUMMARY OF THE INVENTION

The essential object of the present invention is to cope with the inconveniences referred to hereinabove by providing an equipment for and a method of precalcination allowing a reduction by about 30% to 70% of the nitrogen oxides generated by the furnace owing to the effectiveness of the combustion chamber which produces a maximum amount of reducing gas $CO, H_2$ with a minimum amount of unburnt carbon and which causes the partial reduction of $Fe^{+++}$ into $Fe^{++}$ in the mineral materials, the unburnt carbon being present in the form of a strongly reactive coke.

For that purpose tile subject of the invention is an equipment for precalcining any mineral materials whatsoever in powder form, of the type comprising a precalciner consisting essentially of a combustion chamber fed with hot air, of a reaction chamber communicating with the combustion chamber and supplied with smokes rich in nitrogen oxides issuing from a firing furnace and of a cyclone for the separation of the material connected to the reaction chamber by a duct or the like, characterized in that the feed of the combustion chamber with hot air is effected through a first duct opening into the said chamber, a second duct connected at a burner mounted onto the said chamber whereas a third hot air duct is opening into the duct connecting the reaction chamber to the cyclone.

This equipment is further characterized in that the first duct is tangentially connected to the combustion chamber to impart to the hot air a rotary motion within the said chamber, the second duct is opening into a voluted casing surrounding the burner and imparting to the hot air the same direction of rotation and the third duct is opening into the duct connecting to the cyclone so that the hot air flow issuing from this duct makes with the smoke flowing out from the reaction chamber an angle greater than 60°.

According to another characterizing feature of this equipment the smokes rich in nitrogen oxides are injected into the reaction chamber via an adjustment valve whereas at least one valve would adjust the hot air flow rate reaching the aforesaid three ducts and the second and third aforesaid ducts are provided each one with at least one adjustment valve.

According to still another characterizing feature of this equipment, the aforesaid burner consists of at least three coaxial envelopes or shells which from the inside towards the outside are conveying a make-up fuel, air under pressure and a sprayed or atomized fuel carried by a gaseous flow, respectively.

It should further be specified that the air under pressure is injected into the combustion chamber through nozzles tangent to a hyperboloid of revolution inducing a rotary movement in the same direction as that of the hot air.

The asymptotic cone of the hyperboloid of revolution has an angle at the vertex lying between 3° and 90°.

This invention is further directed to a method of precalcining any mineral materials whatsoever in powder form, of the type consisting in calcining the material in a precalciner comprising a combustion chamber fed with hot air, a reaction chamber communicating with the combustion chamber and supplied with smokes rich in nitrogen oxides issuing from a firing furnace, oven or like kiln and a cyclone for the separation of the material connected to the reaction chamber through a duct or the like, characterized in that the hot air is subdivided into a first flow injected tangentially into the combustion chamber and representing from 40% to 85% of the total hot air flow, into a second flow injected at the level of the fuel feed into the combustion chamber and representing from 5% to 30% of the total hot air flow and a third flow injected into the duct connecting the reaction chamber to the cyclone and representing from 10% to 40% of the main flow.

Preferably the first flow represents from 50% to 75%, the second flow represents from 15% to 30% and the third flow represents from 15% to 30% of the total hot air flow.

This method is further characterized in that the speed of injection of the smokes rich in nitrogen oxides into the reaction chamber is lying between 20 m/s and 40 m/s, the mean velocity of the smokes within the reaction chamber is lying between 5 m/s and 20 m/s, preferably ranging from 10 m/s to 15 m/s and the mean velocity of the smokes within the aforesaid duct downstream of the injection of the third air flow is lying between 8 m/s and 24 m/s, preferably ranging from 12 m/s to 18 m/s.

It should further be pointed out here that the axial velocity of injection of the sprayed or atomized fuel into the combustion chamber is lying between 10 m/s and 30 m/s and preferably between 10 m/s and 18 m/s whereas the air under pressure supplied by the burner is injected into the said chamber at a speed higher than 75 m/s and preferably above 150 m/s.

BRIEF DESCRIPTION OF THE DRAWINGS

The invention will be better understood and further objects, characterizing features, details and advantages thereof will appear more clearly as the following explanatory description proceeds with reference to the accompanying diagrammatic drawings given by way of non-limiting example only illustrating a presently preferred specific embodiment of the invention and in which.

DETAILED DESCRIPTION OF THE INVENTION

Figure 1:
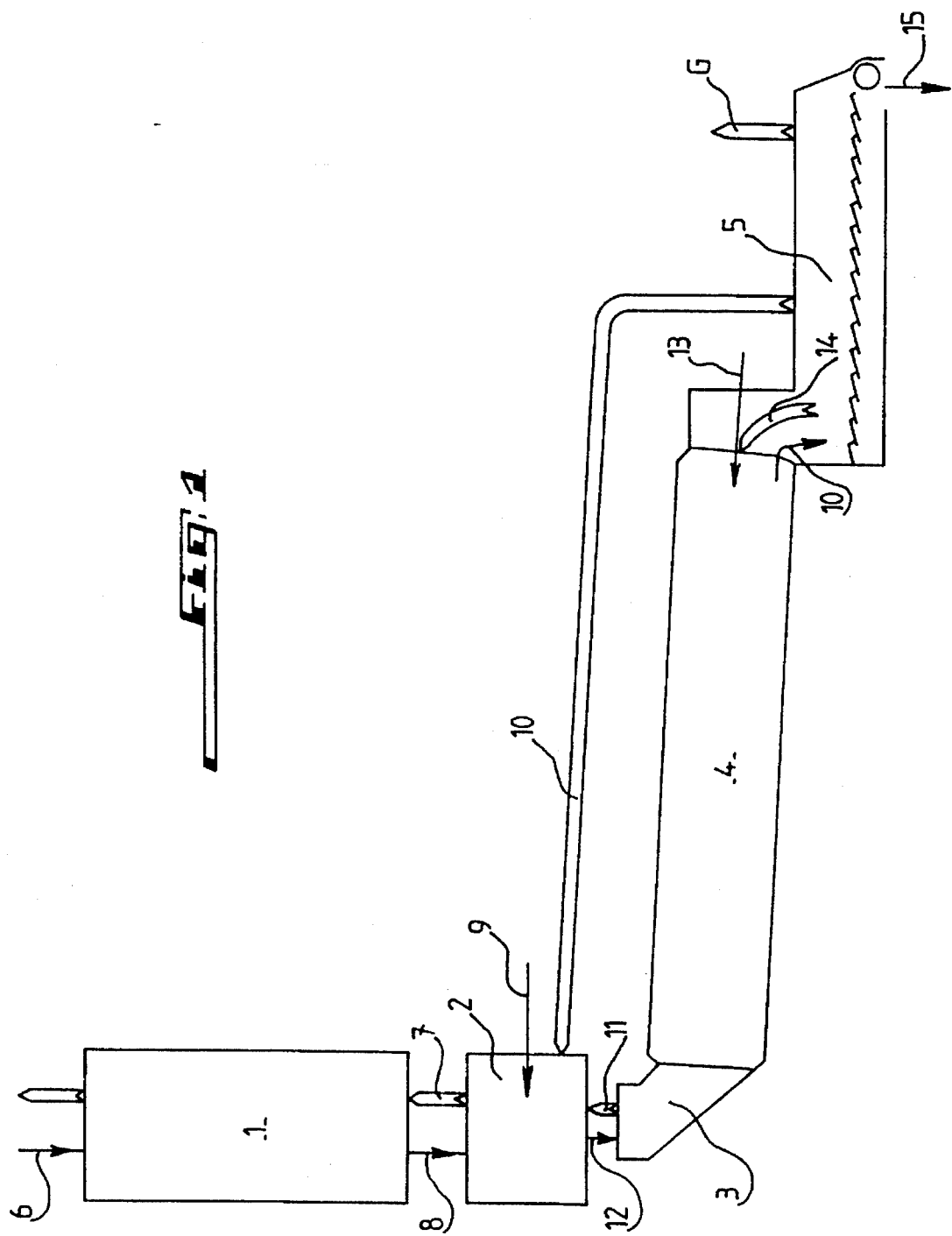
FIG. 1 is a diagrammatic view of an equipment for firing mineral materials, into which is incorporated a precalciner according to this invention.

Referring to FIG. 1, there is shown an equipment for the firing of mineral materials in which the material fed in the powdered state is successively moving through a preheater 1, a precalciner 2, a firing furnace 4 and a cooler 5.

The powdered material is fed at 6 into the preheater 1 in which the hot smokes 7 issuing from the precalciner 2 are preheating the said material.

The hot material 8 moving out of the preheater I is partially calcined in the precalciner 2 by a power supply provided on the one hand from the combustion of a fuel 9 with preheated air arriving through a pipeline 10 leading from the cooler 5 and on the other hand by smokes 11 issuing from the furnace 4 through a junction box 3.

The precalcined material 12 is fed to the furnace 4 through the junction box 3 for completing the calcination by an energy supply from the combustion of a fuel 13 with preheated air 14 coming from the cooler 5. The fired product 10.(which is calcined, clinkerized or molten according to the material) issuing from the furnace 4 is cooled within a cooler 5 and discharged at 15.

Figure 2:
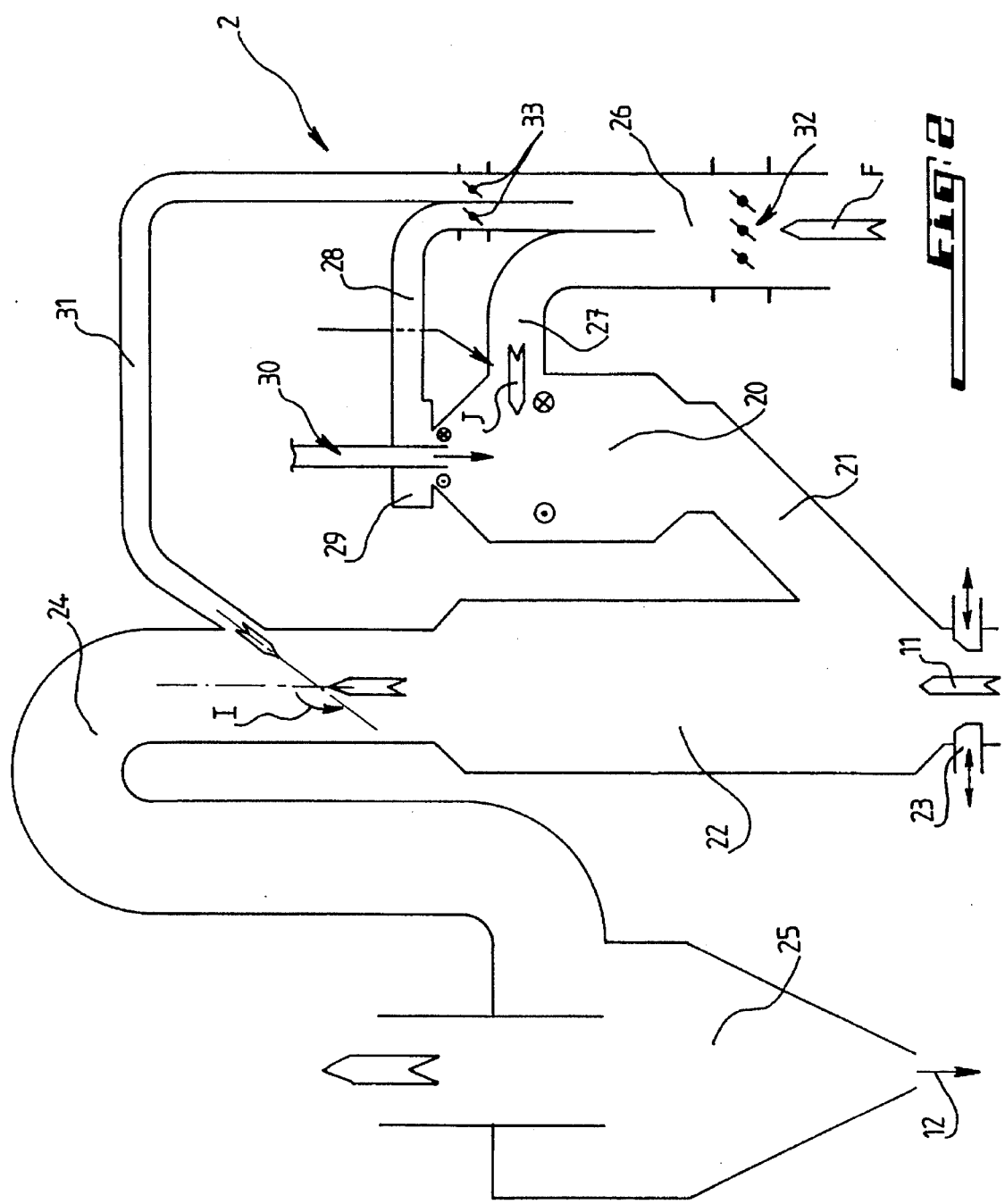
FIG. 2 is a detailed but diagrammatic view of this precalciner.

At least one portion of the hot air recovered from the cooler 5, such as the one flowing into the pipeline 10 is used as combustion air in the precalciner 2 and as physically shown by the arrow F on FIG. 2.

The arrow G on figure I illustrates the hot air excess issuing from the cooler 5 and intended for other purposes or uses.

On FIG. 2, there is seen that the precalciner proper consists of a combustion chamber 20 connected by a passage-way 21 to a reaction chamber 22, the latter being connected through the agency of a valve 23 to the junction box 3 wherefrom are issuing the smokes 11 entering the reaction chamber 22 at the lower part thereof. At its upper part the reaction chamber 22 communicates with a swan-neck-shaped postcombustion duct 24 opening into a cyclone 25 permitting the recovery of the precalcined product at 12.

According to an essential characterizing feature of the invention, the hot air F enters the precalciner 2 through a duct 26 which is subdivided into three ducts, namely a first duct 27 opening tangentially into the combustion chamber 20, a second duct 28 opening through a voluted casing 29 into the said chamber 20 at the level of a burner 30 fitting this chamber and a third duct 3 1 opening into the duct 24 connecting the reaction chamber 22 to the cyclone 25.

It should be pointed here that the first duct 27 and the voluted casing 29 are imparting to the hot air the same direction of rotation within the combustion chamber 20.

The hot air flow issuing from the third duct 31 and as shown by arrows is making with the smokes issuing from the reaction chamber 22 and as physically shown by the arrow I, an angle greater than 60°. This angle should advantageously lie between 140° and 160°.

Figure 3:
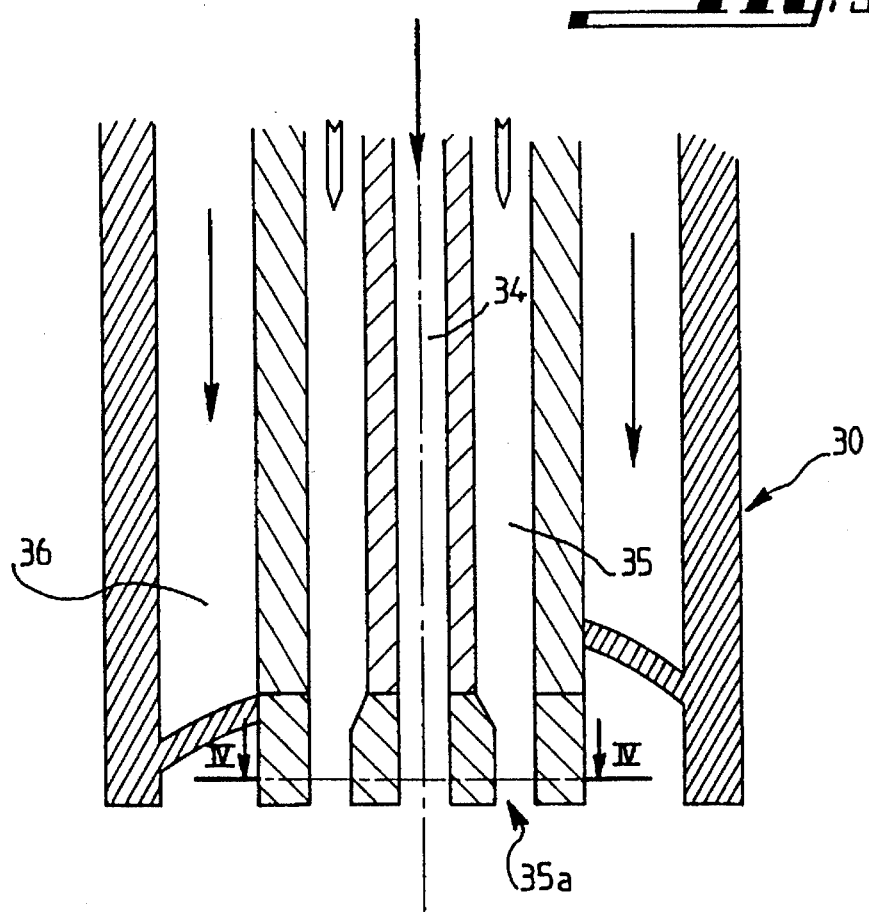
FIG. 3 shows a diagrammatic view in axial section of the bunker fitting the combustion chamber of tile precalciner.

At 32 is shown a set of valves for adjusting the hot air flow rate reaching on the one hand via the first duct 27 the combustion chamber 20 (arrow J) and on the other hand the second and third ducts 28, 31. In each one of these ducts 28, 31 is arranged an adjusting valve 33. Referring now to FIG. 3, there is seen that the burner 30 mounted at the top portion of the combustion chamber 20 in coaxial relation to the voluted casing 29 essentially comprises three coaxial envelopes or shells which are defining from the inside towards the outside: a central passage-way 34 for a make-up fuel which may be heavy fuel oil or recovered solvents, a passage-way 35 providing for the injection of air under pressure and another passage-way 36 through which may issue a sprayed or atomized fuel such as coal carried by a gaseous flow such as air.

Figure 4:
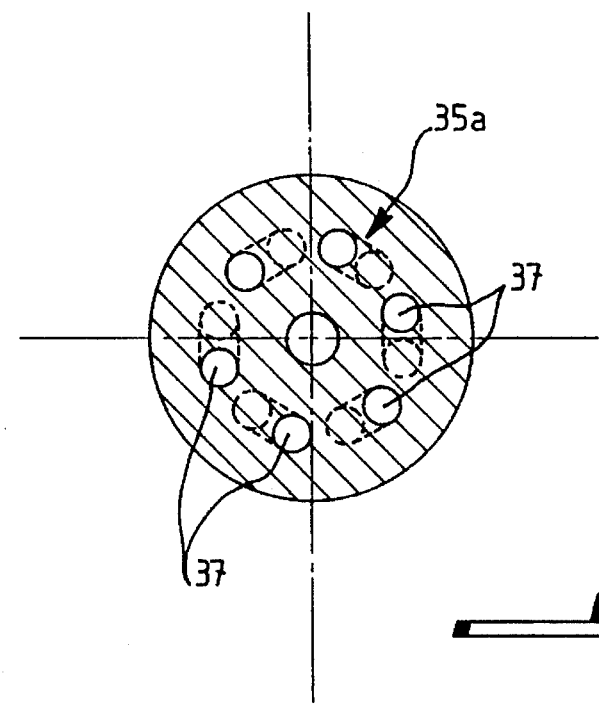
FIG. 4 is a view in section taken substantially along the line IV—IV of FIG. 3.

Referring to FIG. 4 there is seen that the air under pressure is injected into the combustion chamber 20 through a special head 35a comprising a plurality of nozzles 37 with axes tangent to a hyperboloïd of revolution inducing a rotary motion of the same direction as the one flowing out of the voluted casing 29 and as the one flowing out of the first duct 27.

It should be pointed out here that the assymptotic cone of the hyperboloïd of revolution involved exhibits an angle at the apex lying between about 3° and 90° and preferably between 10° and 45°.

The precalcining equipment according to this invention having been thus described, its operation as ,.veil as its many advantages will now be setforth hereinafter.

To obtain the desired effect, i.e. a very strong decrease of the nitrogen oxides content of the smokes issuing from the firing furnace 4, several parameters should be acted upon and a specific combination of parameters should be adopted.

At first, at the combustion chamber 20 which should operate as a reducing gas generator, it is necessary to stabilize the flame of the burner 30 which is naturally unstable under these conditions and this is why according to the invention, there is used for the combustion chamber 20 a flame stabilizing vortex consisting of the combination of the voluted casing 29 with the special pressure air injection head 35a and with the tangential injection of hot air at J. Moreover the control of the air flow rate within the second duct 28 owing to the valve 33 permits the obtaining of a maximum temperature at the outlet of the burner 30 without as much inducing the melting of the mineral materials. These arrangements advantageously permit the avoidance of unburnt carbons in the solid state and the promotion of the production of reducing gas conveyed into the reaction chamber 22 via the duct 21.

At this chamber the high speed injection of the smokes 11 owing to the valve 23, associated with a low average velocity of the smokes-reducing gas mixture within this chamber permits the optimizing of the reduction reaction kinetics through increase of the turbulences within the said chamber. This result is obtained by using a smokes speed lying between 20 m/s and 40 m/s with a mean velocity in the reaction chamber 22 ranging from 5 m/s to 20 m/s. Preferably the velocity of the smokes 11 is lying between 25 m/s and 35 m/s and the mean velocity within the chamber 22 is lying between 10 m/s and 15 m/s.

Moreover at the injection of hot air through the duct 31 into the postcombustion duct 24, there should also be obtained a homogeneous mixture of the oxidizing air and of the residual reducing smokes. This is provided by using a hot air injection speed lying between 20 m/s and 40 m/s and an injection angle greater than 60°. Furthermore the mean velocity downstream of the injection point of the duct 31, i.e. in the postcombustion duct 24 should allow a sufficient residence time while maintaining a good level of turbulence. This is why this mean velocity is selected to be between 8 m/s and 24 m/s and preferably between 12 m/s and 18 m/s.

Thus by choosing for example to carry 65% of the hot air through the first duct 27 into the combustion chamber 20, 15% of hot air through the duct 28 into the voluted casing 29 and 20% of hot air into the duct 24 via the duct 31, it is possible by using as a fuel in the burner 30, a mixture of petroleum coke or mineral oil coke and of sprayed or atomized coal to obtain a reduction in the nitrogen oxides content by 47% in the smokes rich in nitrogen oxides issuing from the furnace 4 while keeping a rate of solid unburnt residues in the materials moving out of the cyclone 25 of at least 4% of the total amount of fuel conveyed by the burner 30 into the combustion chamber. In this particular example, the fuel injection speed was 15 m/s, the velocity of the smokes 11 was 24 m/s, the mean speed of the mixture within the reaction chamber 22 was 11.5 m/s and the speed within the postcombustion duct 24 was 14 m/s.

There has therefore been provided according to the invention an equipment for and a method of precalcination providing outstanding advantages in particular with respect to the reduction of the emissions of nitrogen oxides which are harmful to the environment.

The invention is of course not at all limited to the embodiment described and shown which has been given by way of example only.

On the contrary the invention comprises all the technical equivalents of the means described as well as their combinations if the latter are carried out according to its gist and within the scope of the appended claims.

What is claimed is:

1. A method for precalcining a mineral material in powder form comprising the steps of:

feeding a mineral material into a combustion chamber, directing a first hot air stream into said combustion chamber, feeding fuel into said combustion chamber through a burner, directing a second hot air stream into said combustion chamber in proximity to said burner, passing combustion gases and the mineral material from said combustion chamber into a reaction chamber in which precalcination occurs, directing the combustion gases and mineral material in said reaction chamber into contact with gases containing nitrogen oxides discharged from a firing furnace, directing a third hot air stream in a post combustion zone into contact with a stream of resultant products of the gases and mineral material from said reaction chamber, and thereafter separating the resultant precalcined mineral material from the gases and discharging the separated gases, and directing the precalcined mineral material to the firing furnace.

2. The method of claim 1, further comprising the step of portioning the total amount of hot air being passed into said combustion chamber and the post combustion zone such that said first hot air stream amounts to from about 40% to about 85% of the total amount of hot air, said second hot air stream amounts to from about 5% to about 30% of the total amount of hot air, and said third hot air stream amounts to from about 10% to about 40% of the total amount of hot air.

3. The method of claim 2, wherein said first hot air stream amounts to from about 50% to about 75% of the total amount of hot air, said second hot air stream amounts to from about 15% to about 30% of the total amount of hot air, and said third hot air stream amounts to from about 15% to about 30% of the total amount of hot air.

4. The method of claim 1, further comprising the step of injecting the gases containing nitrogen oxides from the firing furnace as a stream into the reaction chamber, said stream of gases being injected at a velocity between about 20 m/s and about 40 m/s, the average speed of the gases within the reaction chamber being between about 5 m/s and about 20 m/s and the average speed of the gases within said post combustion zone after said third hot air stream has contacted said stream of resultant products of the gases and mineral material being between about 8 m/s and about 24 m/s.

5. The method of claim 1, further comprising the steps of injecting the fuel into said combustion chamber in an axial direction thereof and providing the injected fuel with an axial velocity between about 10 m/s and about 30 m/s, and injecting the second hot air stream into said combustion chamber at a velocity higher than about 75 m/s.

6. The method of claim 5, wherein the second hot air stream is injected into said combustion chamber at a velocity higher than about 150 m/s.

7. The method of claim 4, wherein the average speed of the gases within the reaction chamber is from about 10 m/s to about 15 m/s and the average speed of the gases within said post combustion zone after said third hot air stream has contacted said stream of resultant products of the gases and mineral material is from about 12 m/s to about 18 m/s.

8. The method of claim 1, wherein the first hot air stream rotates in said combustion chamber and the second hot air stream rotates in the same direction of rotation as the first hot air stream.

* * * * *